US008228961B2

(12) United States Patent
Chang et al.

(10) Patent No.: US 8,228,961 B2
(45) Date of Patent: Jul. 24, 2012

(54) TEMPERATURE FEEDBACK CONTROL FOR LONG-TERM CARRIER-ENVELOPE PHASE LOCKING

(75) Inventors: Zenghu Chang, Manhattan, KS (US); Chenxia Yun, Manhattan, KS (US); Shouyuan Chen, Manhattan, KS (US); He Wang, Manhattan, KS (US); Michael Chini, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 13/320,226

(22) PCT Filed: May 27, 2010

(86) PCT No.: PCT/US2010/036318
§ 371 (c)(1),
(2), (4) Date: Nov. 11, 2011

(87) PCT Pub. No.: WO2011/019434
PCT Pub. Date: Feb. 17, 2011

(65) Prior Publication Data
US 2012/0057611 A1    Mar. 8, 2012

Related U.S. Application Data

(60) Provisional application No. 61/181,529, filed on May 27, 2009.

(51) Int. Cl.
*H01S 3/10* (2006.01)
*H01S 3/13* (2006.01)
*H01S 3/00* (2006.01)

(52) U.S. Cl. ............... 372/38.01; 372/26; 372/29.02

(58) Field of Classification Search ............. 372/26, 372/29.011, 29.016, 29.02, 29.023, 34, 38.01, 372/38.02
See application file for complete search history.

(56) References Cited

OTHER PUBLICATIONS

International Search Report and Written Opinion mailed Feb. 28, 2011 for International Application No. PCT/US2010/036318, filed May 27, 2010; Inventors: Chang, Zenghu et al. ( 7 pages).
Article entitled Generation of Intense, Carrier-Envelope Phase-Locked Few-Cycle Laser Pulses through Filamentation; Applied Physics B; Author: Hauri, C.P., et al.; Sep. 2004, vol. B79, pp. 673-677.
Article entitled Generation of Carrier-Envelope-Phase Stablized 3.3-fx Optical Pulses; 2005 Conference on Lasers and Electro-Optics Europe; Author: Yamane, K. et al.; Jun. 2005; p. 384; Figures 1-2.

(Continued)

*Primary Examiner* — Armando Rodriguez
(74) *Attorney, Agent, or Firm* — Hovey Williams LLP

(57) ABSTRACT

A feedback control module for stabilizing a carrier-envelope phase of an output of a laser oscillator system comprises a first photodetector, a second photodetector, a phase stabilizer, an optical modulator, and a thermal control element. The first photodetector may generate a first feedback signal corresponding to a first portion of a laser beam from an oscillator. The second photodetector may generate a second feedback signal corresponding to a second portion of the laser beam filtered by a low-pass filter. The phase stabilizer may divide the frequency of the first feedback signal by a factor and generate an error signal corresponding to the difference between the frequency-divided first feedback signal and the second feedback signal. The optical modulator may modulate the laser beam within the oscillator corresponding to the error signal. The thermal control unit may change the temperature of the oscillator corresponding to a signal operable to control the optical modulator.

20 Claims, 4 Drawing Sheets

OTHER PUBLICATIONS

Article entitled Carrier-Envelope_Phase Stabilized 3.3-fs Optical Pulses in the Monocycle Region; 2005 Quantum Electronics and Laser Science Conference (QELS); Author: Yamane, K. et al; May 2005, pp. 1615-1617; Figures 1-3.

Article entitled Characterization of Quasi-Monocyle NIR Pulses with Stabilized Carrier-Envelope Phase by XFROG; c Conference on Lasers and Electro-Optics, 2004. (CLEO); Author: Adachi, S. et al.; May 2004, vol. 1.

Article entitled An Antiresonant Fabry-Perot Saturable Absorber for Passive Mode-Locking Fabricated by Metal-Organic Vapor Phase Epitaxy and Ion Implantation Design, Characterization, and Mode-Lockiing; Author: Lederer, M. J., et al.; Quantum Electronics, vol. 34, No. 11, Nov. 1998, pp. 2150-2161.

TEMPERATURE FEEDBACK CONTROL FOR LONG-TERM CARRIER-ENVELOPE PHASE LOCKING

RELATED APPLICATIONS

This application is a U.S. national stage submission under 35 U.S.C. 371 of International Patent Application No. PCT/2010/36318, filed May 27, 2010, which claims the benefit of U.S. Provisional Patent Application No. 61/181,529, filed May 27, 2009, both of which are hereby incorporated by reference in their entirety.

FEDERALLY SPONSORED RESEARCH OR DEVELOPMENT PROGRAM

The present invention was developed with support from the U.S. government under Grant No. 0457269 awarded by the National Science Foundation, Grant No. DE-FG02-86ER13491 awarded by the Department of Energy, and Grant No. W911NF-07-1-0475 awarded by the U.S. Army Research Office. Accordingly, the U.S. government has certain rights in the present invention.

BACKGROUND OF THE INVENTION

1. Field of the Invention

Embodiments of the present invention relate to generally a laser oscillator. More particularly, embodiments of the present invention relate to methods and apparatuses for stabilizing the carrier envelope phase of the output of a laser oscillator.

2. Description of the Related Art

Chirped-pulse amplified (CPA) laser systems which are capable of producing high-energy sub 5 femtosecond (fs) pulses may be utilized in nonlinear optics and high-field physics applications such as high-harmonic generation using an oscillator beam, above-threshold ionization (ATI), Fourier synthesis of a multicolor laser, attosecond physics, high-frequency metrology, and, more broadly, biological imaging and medical surgery. In order to be effective in such applications, the carrier-envelope phase (CEP) of the output of the laser system must be stabilized for long periods of time. Often, the CEP is stabilized by locking the carrier-envelope offset frequency ($f_{CEO}$). Approaches to locking the $f_{CEO}$ may include controlling the power output of the pump laser source with an acousto-optic modulator (AOM). However, due in part to the environmental conditions of the laser system equipment, the $f_{CEO}$ may slowly increase beyond the range of frequencies for which the AOM can compensate, thereby limiting the amount of time that the $f_{CEO}$ is locked and the CEP is stabilized.

SUMMARY OF THE INVENTION

Embodiments of the present invention solve the above-mentioned problems and provide a distinct advance in the art of stabilizing the carrier envelope phase of the output of a laser system. More particularly, embodiments of the invention provide methods and apparatuses for stabilizing the carrier envelope phase of the output of a laser system by controlling the power output of the pump laser source and controlling the temperature of the components of the oscillator of the laser system.

A feedback control module for stabilizing a carrier-envelope phase of an output of a laser oscillator system comprises a first beam splitter, a first photodetector, a second beam splitter, a low-pass filter, a second photodetector, a phase stabilizer, an optical modulator driver, an optical modulator, a thermal control driver, and a thermal control element. The first beam splitter may redirect a first portion of a laser beam from an oscillator. The first photodetector may receive the first portion of the laser beam and may generate a corresponding first feedback signal. The second beam splitter may redirect a second portion of the laser beam to the low-pass filter which may filter the higher frequencies of the second portion of the laser beam. The second photodetector may receive the filtered second portion of the laser beam and may generate a corresponding second feedback signal.

The phase stabilizer may divide the frequency of the first feedback signal by a factor and generate an error signal corresponding to the difference between the frequency-divided first feedback signal and the second feedback signal. The optical modulator driver may receive the error signal and may generate a signal for the optical modulator which may modulate the laser beam within the oscillator corresponding to the error signal. The thermal control driver may receive the signal for the optical modulator and may generate a signal for the thermal control unit which may change the temperature of the oscillator corresponding to the signal for the optical modulator.

A method for stabilizing the carrier-envelope phase of a laser oscillator system may comprise the steps of: generating an electrical first feedback signal corresponding to a first portion of a laser beam from an oscillator, filtering a second portion of the laser beam using a low-pass filter, generating an electrical second feedback signal corresponding to the filtered second portion of the laser beam, dividing the frequency of the first feedback signal by a factor, generating an error signal corresponding to the difference between the frequency-divided first feedback signal and the second feedback signal, and changing the temperature of the oscillator corresponding to an optical modulator signal.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
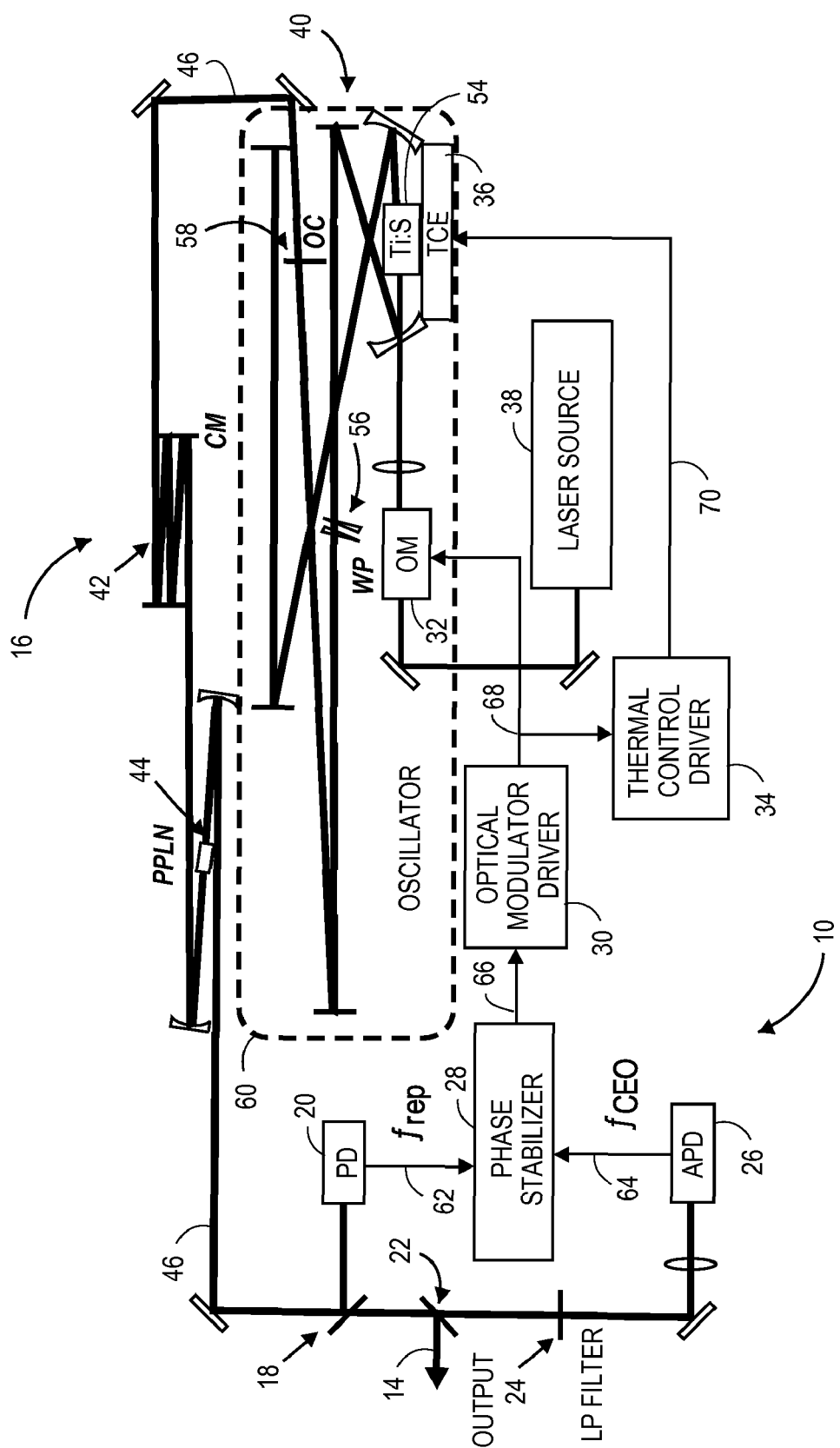
FIG. 1 is a schematic block diagram of a laser oscillator system that includes a feedback control module constructed in accordance with various embodiments of the current invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A feedback control module 10 constructed in accordance with at least one embodiment of the current invention for stabilizing a carrier-envelope phase (CEP) 12 of an output 14 of a laser oscillator system 16 is shown in FIG. 1. The feedback control module 10 may broadly comprise a first beam splitter 18, a first photodetector 20, a second beam splitter 22, a low-pass filter 24, a second photodetector 26, a phase stabilizer 28, an optical modulator driver 30, an optical modulator 32, a thermal control driver 34, and a thermal control element 36. The laser oscillator system 16 may include a laser source 38, an oscillator 40, a chirped-mirror unit 42, a periodically-poled lithium niobate (PPLN) crystal 44, and the laser oscillator system output 14, and may further include various optical components and hardware such as lenses, mirrors, filters, prisms, beam splitters, gratings, mounts, diaphragms, rotary and linear translation stages, and the like, some of which may be shown in the figures. The laser oscillator system 16 generally provides signals that may be further amplified by a chirped-pulse amplification (CPA) laser system, as is known in the art, or similar amplification systems.

A second embodiment of the feedback control module 10 may include the optical modulator 32 and the thermal control element 36 for stabilizing the CEP 12 of the output 14 of the laser oscillator system 16. A third embodiment of the feedback control module 10 may include the first photodetector 20, the second photodetector 26, the phase stabilizer 28, the optical modulator 32, and the thermal control element 36 for stabilizing the CEP 12 of the output 14 of the laser oscillator system 16. An alternative embodiment of the laser oscillator system 16 may include the laser source 38, the oscillator 40, and the feedback control module 10.

Figure 2:
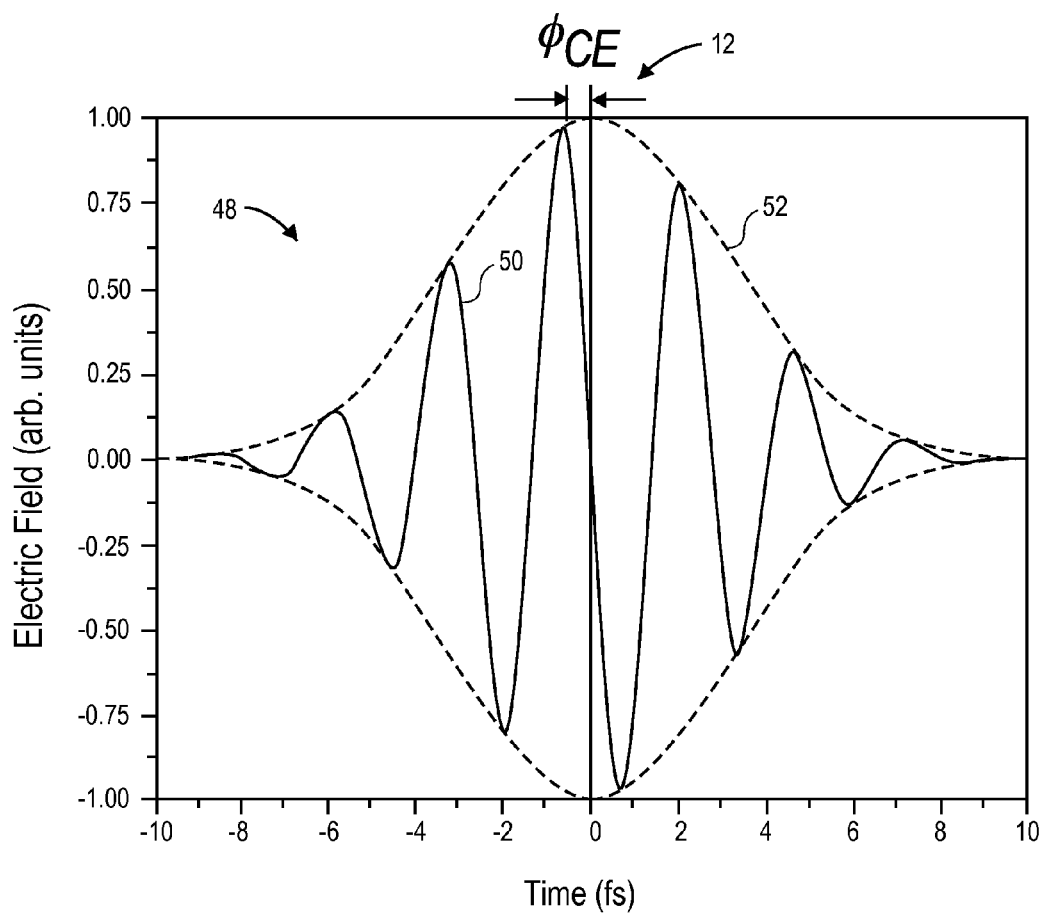
FIG. 2 is a plot of the electric field of a laser beam from the laser oscillator system versus time.

The laser oscillator system output 14, along with the signals at various stages of the laser oscillator system 16, may be a laser beam 46. As used herein, the laser beam 46 may refer to a continuous wave (CW) laser output, or more often, to a series of laser pulses. The laser beam 46 may possess an electric field 48 as shown in FIG. 2, wherein the electric field 48 versus time is plotted. The electric field 48, shown in arbitrary units, may include a higher-frequency carrier (C) wave 50 that is modulated by a lower-frequency pulse envelope (E) 52. The difference between the peak of the envelope 52 and the peak of the nearest carrier wave 50 is the CEP 12, also known as $\phi_{CE}$. It is possible that the peak of the carrier wave 50 may vary relative to the peak of the envelope 52, resulting in a change in the CEP 12. A carrier-envelope offset frequency ($f_{CEO}$) may be proportional to the change in the CEP 12.

The laser source 38 may include any elements or combination of elements operable to generate or pump laser light. The laser source 38 may include a pump laser such as a diode-pumped solid-state (DPSS) laser like the VERDI™ 6 laser by Coherent, Inc. of California and/or the laser source disclosed by U.S. Pat. No. 7,050,474. which is incorporated herein by reference. The laser source 38 may generate a CW laser beam 46 to be received by the oscillator 40.

The oscillator 40 may include any elements or combination of elements operable to generate laser pulses at a desired wavelength, amplitude, and duration. The oscillator 40 may include a crystal 54, a wedge pair 56, and an output coupler 58, as well as various standard optical components and hardware. The oscillator 40 may further include a cavity 60, represented by the dashed line in FIG. 1, in which laser pulses may be formed, as is known in the art. The oscillator 40 may be mode-locked, such that the oscillator 40 receives the laser beam 46 from the laser source 38 and produces a series of laser pulses of a given wavelength at a given repetition rate ($f_{rep}$). In various embodiments, the pulses may be less than 7 femtoseconds (fs) in duration and may be produced at a rate, $f_{rep}$, of 78 MegaHertz (MHz). An exemplary oscillator 40 may be the RAINBOW™ oscillator from FEMTOLASERS, Inc. of Austria.

The crystal 54 may include an optical crystal, such as a titanium-sapphire (Ti:Sapphire) crystal, that acts as a lasing medium. The crystal 54 generally is pumped, as is known in the art, by the laser source 38.

The wedge pair 56 may include a pair of dual-faced wedge-shaped prisms. The prisms may be positioned such that one face of one prism is held in opposition to one face of the other prism at close proximity. The prisms may be movable and/or rotatable with respect to one another. The wedge pair 56 may be used to correct the phase of the pulses generated by the oscillator 40, to shorten the pulses generated by the oscillator 40, to fine tune, adjust, or control the dispersion of the pulses in the cavity 60 of the oscillator 40, or combinations thereof.

The output coupler 58 may include a partially reflective mirror or other similar glass-type materials that include a reflective coating on at least one surface. The output coupler 58 may be positioned near one end of the interior of the cavity 60 and may reflect most of the radiation generated in the cavity 60 to remain in the cavity 60, but may allow a percentage of the radiation to be transmitted out of the cavity 60. In various embodiments, the output coupler 58 may have a 10% transmission rate.

The chirped-mirror unit 42 may include a plurality of chirped or dielectric-based mirrors, as are known in the art. The mirrors may be positioned opposing one another to reflect the pulses from the oscillator 40 a number of times. The chirped-mirror unit 42 may be utilized to compress the pulses from the oscillator 40, to compensate for chromatic dispersion, or a combination of both.

The PPLN crystal 44 may include crystals of the appropriate material and configuration to change the wavelength of the laser beam 46. Thus, the PPLN crystal 44 may receive pulses from the chirped-mirror unit 42 in one wavelength and may transmit pulses to the laser oscillator system output 14 in a different wavelength. For example, the PPLN crystal may receive pulses with a wavelength of 800 nanometers (nm) and may transmit pulses with a wavelength of 1.4 micrometers (µm).

Embodiments of the oscillator 40, the chirped-mirror unit 42, and the PPLN crystal 44 as disclosed herein and shown in FIG. 1 are exemplary. The oscillator 40 may include different components or may have a different geometry. Furthermore, the chirped-mirror unit 42, the PPLN crystal 44, or both may be omitted.

The first beam splitter 18 may include a plurality of prisms that are properly spaced apart or coated with reflective material to reflect a desired percentage of the incident laser beam 46, as is known in the art. The remainder of the incident laser beam 46 is transmitted. The first beam splitter 18 may receive the laser beam 46 from the PPLN crystal 44 and reflect a small percentage of the laser beam 46 to the first photodetector 20.

The first photodetector 20 may include photosensitive materials that are capable of receiving optical energy and converting the energy to electrical energy. Various embodiments of the first photodetector 20 may include a photodiode. For example, the first photodetector 20 may receive a portion of the laser beam 46 from the first beam splitter 18 and may generate a varying voltage first feedback signal 62 that corresponds to the pulses generated by the oscillator 40, which are generated at the repetition rate, $f_{rep}$.

The second beam splitter 22 may be similar to the first beam splitter 18 and may receive the transmitted laser beam 46 from the first beam splitter 18. The laser beam 46 may be split by the second beam splitter 22 with the majority of the laser beam 46, either through transmission or reflection, becoming the laser oscillator system output 14. A small percentage of the laser beam 46 is directed toward the low-pass (LP) filter 24.

The LP filter 24 may include optical filters that are capable of attenuating shorter wavelengths or higher frequencies of radiation, thereby allowing lower frequencies of the laser beam 46 to pass through. The small percentage of the laser beam 46 from the second beam splitter 22 passes through the LP filter 24 and may be focused onto the second photodetector 26.

The second photodetector 26 may include photosensitive materials that are capable of receiving optical energy and converting the energy to electrical energy. In particular, the second photodetector 26 may include an avalanche photodiode, as is known in the art. The second photodetector 26 may receive the small percentage of the laser beam 46 from the LP filter 24 and may generate a varying voltage second feedback signal 64 at the carrier-envelope offset frequency, $f_{CEO}$.

The phase stabilizer 28 may include electrical or electronic circuitry, also known as locking electronics, such as signal amplifiers, filter circuits, control circuits, digital signal processors, microprocessors, and the like, that are capable of receiving the first feedback signal 62 and the second feedback signal 64 and generating an electrical error signal 66. The phase stabilizer 28 may divide the frequency of the first feedback signal 62, which oscillates at the repetition rate, $f_{rep}$, by four (the frequency-relational factor between $f_{rep}$ and $f_{CEO}$) and then compare the result with the second feedback signal 64, which oscillates at the carrier-envelope offset frequency, $f_{CEO}$. The error signal 66 may be proportional to the difference between the frequency-divided first feedback signal 62 and the second feedback signal 64. An exemplary phase stabilizer 28 is the XPS800 Femtosecond Phase Stabilization Unit manufactured by Menlo Systems GmbH of Germany.

The optical modulator driver 30 may include electrical or electronic circuitry, such as signal amplifiers, filter circuits, control circuits, digital signal processors, microprocessors, and the like, that are capable of generating an electrical optical modulator signal 68 based on the error signal 66 from the phase stabilizer 28. The optical modulator signal 68 may be generated to change the appropriate parameters of the optical modulator 32 in order to adjust, control, or manipulate the CEP 12 based on the error signal 66. Generally, the CEP 12 is adjusted in order to minimize the error signal 66. The optical modulator signal 68 may be a variable voltage signal.

The optical modulator 32 may include crystals, gratings, mirrors, other electro-optical components, or combinations thereof, as well as electrically-controlled transducing elements that are capable of modulating an optical property of the laser beam 46. In some embodiments, the optical modulator 32 may include an acousto-optic modulator (AOM). In other embodiments, the optical modulator 32 may include a mirror positionally controlled by a piezoelectric transducer. The optical modulator 32 may be placed in the path of the laser beam 46 from the laser source 38, typically within the cavity 60 of the oscillator 40, and may modulate the laser beam 46 before the laser beam 46 couples with the crystal 54. The modulation of the laser beam 46 may affect the CEP 12 and may further modelock the laser beam 46 in the oscillator 40.

The thermal control driver 34 may include electrical or electronic circuitry, such as signal amplifiers, digital signal processors, control circuits, microprocessors, and the like, that are capable of generating an electrical thermal control signal 70. In various embodiments, the electrical thermal control signal 70 may be generated based on the optical modulator signal 68 from the optical modulator driver 30. In general, the electrical thermal control signal 70 may be a variable voltage signal capable of modifying the temperature of the thermal control element 36.

The thermal control element 36 may include heating components such as coils or electrically-resistive elements that generate heat, cooling elements such as compressors, condensers, or chillers, or combinations thereof. The thermal control element 36 may further include at least one output surface or at least one output port, of which the temperature is controlled. The thermal control element 36 may be used to control the temperature of various components within the oscillator 40, such as the crystal 54, or the entire cavity 60 of the oscillator 40. Thus, the thermal control element 36 may be positioned in close proximity to or in contact with the crystal 54 or other oscillator 40 components. In various embodiments, the thermal control element 36 may be integrated with or enclosed within the cavity 60 of the oscillator 40.

The laser oscillator system 16 along with the feedback control module 10 may operate as follows. The laser source 38 may generate the laser beam 46 to be received by the crystal 54 within the oscillator 40. The laser beam 46 may be reflected, steered, focused, collimated, or otherwise manipulated throughout the laser oscillator system 16 by various optical components included in the system 16, but not discussed in detail. The oscillator 40 may produce a series of laser pulses of a given wavelength at the repetition rate. The pulses may be further conditioned by the wedge pair 56 within the cavity 60 of the oscillator 40. The output coupler 58 may allow a percentage of the pulses to exit the cavity 60 and to be transmitted to the chirped-mirror unit 42. Pulses exiting the oscillator 40 may be compressed and may have their wavelength changed by the chirped-mirror unit 42 and the PPLN crystal 44. Pulses that exit the PPLN crystal 44 are generally directed to the laser oscillator system output 14.

A first portion of the laser beam 46 traveling from the PPLN crystal 44 to the laser oscillator system output 14 may be redirected by the first beam splitter 18 to the first photodetector 20. A second portion of the laser beam 46 may be redirected by the second beam splitter 22 to the LP filter 24. The remainder of the laser beam 46 may form the laser oscillator system output 14. The pulses of the laser oscillator system output 14 with the same CEP 12 may be selected by a Pockets cell and then further amplified by a CPA.

The first photodetector 20 may generate the first feedback signal 62 based on the pulses from the oscillator 40. The first feedback signal 62 may include a varying voltage corresponding to the repetition rate, $f_{rep}$. The LP filter 24 may filter or attenuate the shorter wavelengths of the laser beam 46 received from the second beam splitter 22. The laser beam 46 may be focused onto the second photodetector 26 which may generate the second feedback signal 64 based on the filtered pulses from the oscillator 40. The second feedback signal 64 may include a varying voltage corresponding to the carrier-envelope offset frequency, $f_{CEO}$.

The first feedback signal 62 and the second feedback signal 64 may be received by the phase stabilizer 28 which may generate the error signal 66 corresponding to differences between the frequency-divided first feedback signal 62 and the second feedback signal 64. The optical modulator driver 30 may receive the error signal 66 and in response may generate the optical modulator signal 68. The optical modulator 32 may use the optical modulator signal 68 to modulate an optical property of the laser beam 46, which in turn may adjust or control the CEP 12.

The thermal control driver 34 may also receive the optical modulator signal 68 and generate the thermal control signal 70 corresponding to the optical modulator signal 68. The thermal control signal 70 generally adjusts the temperature of the thermal control element 36, and in turn the oscillator 40, to slowly track the trend of the optical modulator signal 68. In general, adjusting the temperature of the oscillator 40 may adjust or control the CEP 12 and leads to stabilization of the CEP 12 over longer periods of time than just optically modulating the laser beam 46 in the cavity 60 of the oscillator 40 alone.

To demonstrate the performance of the feedback control module 10, an exemplary embodiment was constructed and integrated with an exemplary laser oscillator system 16. In order to develop a relationship between the output of the oscillator 40 and the temperature of the oscillator 40, the spectral output of the oscillator 40 was measured while the temperature of the oscillator 40 was swept from approximately 10 degrees Celsius (C) to approximately 23 degrees C. Between the temperature range of approximately 10.2 degrees C. and approximately 22.8 degrees C., the performance of the oscillator 40 was consistent. Outside of the range of temperatures, the performance of the oscillator 40 changed. As a result, it was determined for consistent performance of the oscillator 40, the temperature of the oscillator 40 may be maintained in the range from approximately 13 degrees C. to approximately 21 degrees C.

The optical modulator driver 30 in the exemplary embodiment was able to generate the optical modulator signal 68 with an effective driving voltage range of approximately 0.1 Volts (V) to approximately 0.9 V. The thermal control driver 34 was configured to generate the thermal control signal 70 such that the temperature of the thermal control element 36, and in turn the oscillator 40, slowly tracked the average value of the optical modulator signal 68. One approach was to vary the temperature of the thermal control element 36 0.1 degrees C. whenever the optical modulator signal 68 voltage varied outside of the range of approximately 0.3 V to approximately 0.7 V.

Figure 3:
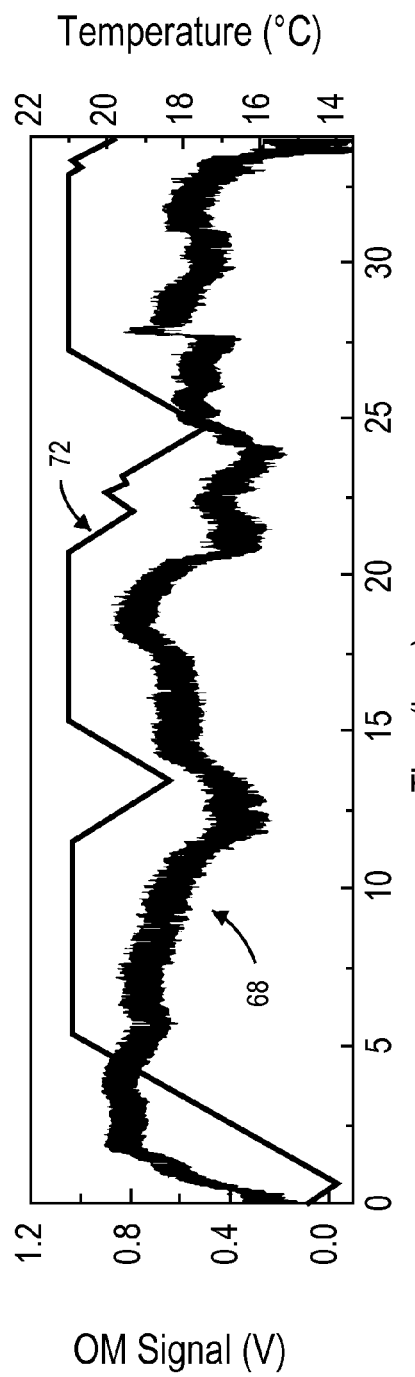
FIG. 3 is a plot of a recorded performance of a thermal control element and an optical modulator driver versus time.

FIG. 3 shows the recorded performance of the thermal control element 36 and the optical modulator signal 68 versus time. The scale for the optical modulator signal 68 is shown on the left vertical axis, and the scale for the temperature of the thermal control element 36, and in turn the oscillator 40, is shown on the right vertical axis. As can be seen, the temperature of the thermal control element 36, and in turn the oscillator 40, generally tracks the trend of the optical modulator signal 68.

Figure 4:
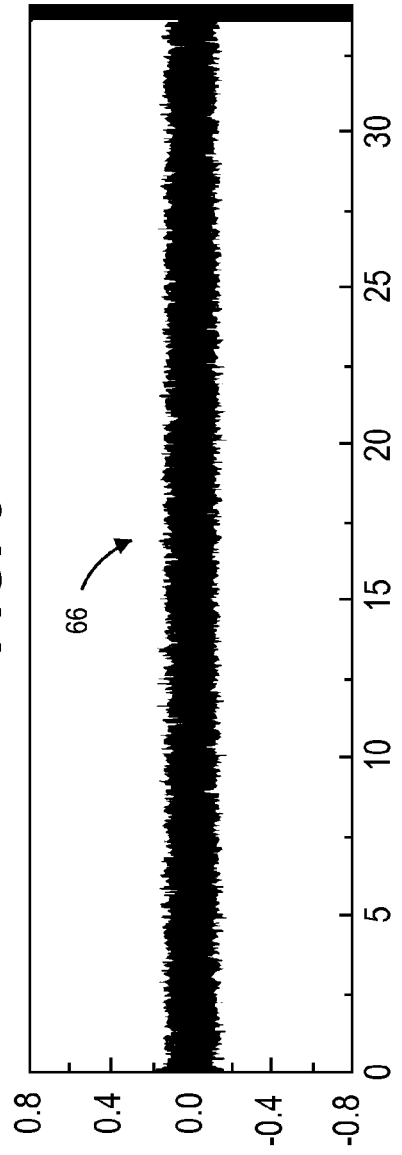
FIG. 4 is a plot of an error signal from a phase stabilizer versus time.

FIG. 4 shows the recorded value of the error signal 66 from the phase stabilizer 28 versus time. The value of the error signal 66 generally corresponds to the stability of the CEP 12, such that a smaller value of the error signal 66 indicates CEP 12 stability and a larger value of the error signal 66 indicates CEP 12 instability. As can be seen, the error signal 66 maintained an average value of around zero V for approximately 34 hours continuously, indicating that the CEP 12 was stable during that time as well.

Figure 5:
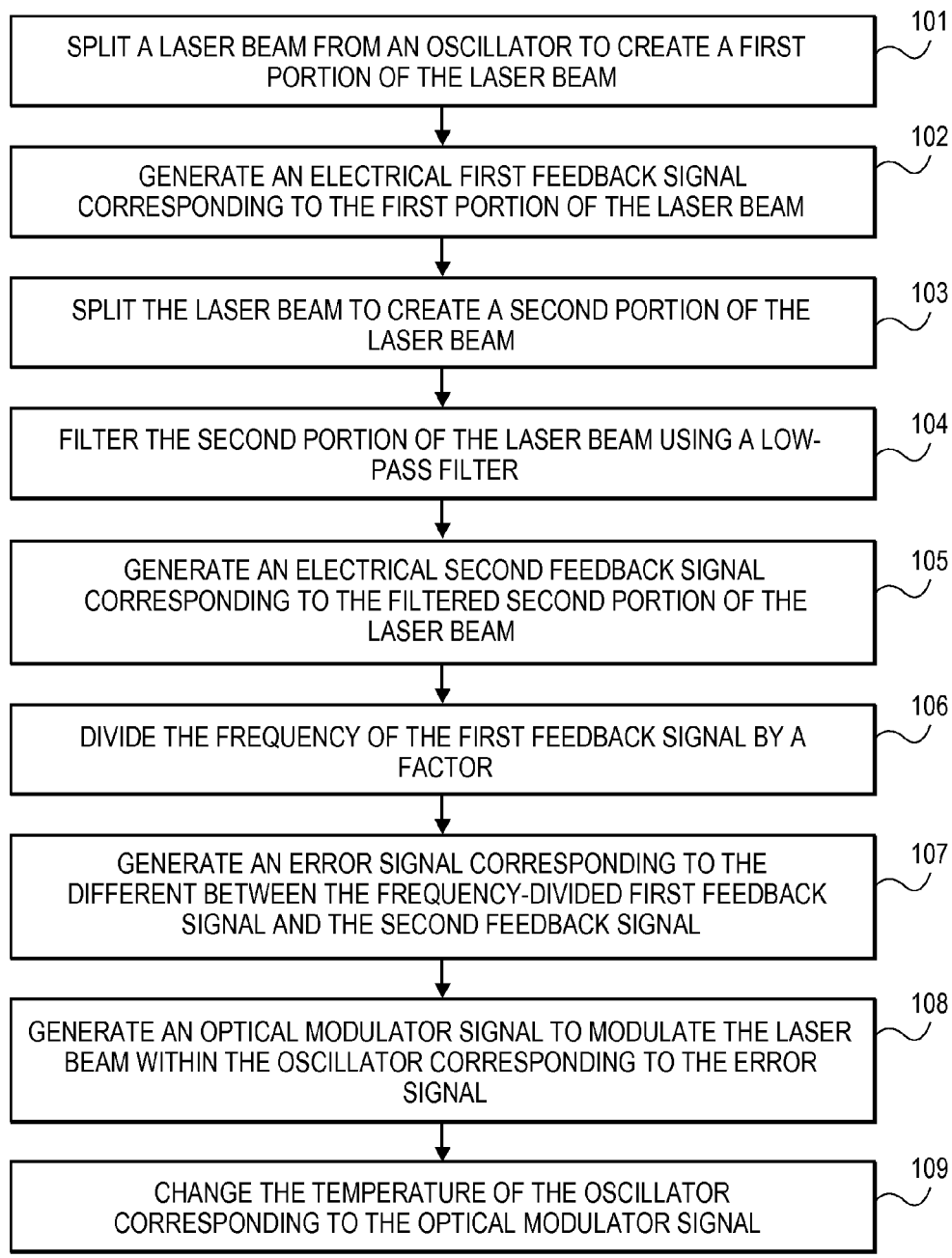
FIG. 5 is a flow diagram of a portion of the steps of a method for stabilizing a carrier-envelope phase (CEP) of the laser oscillator system.

At least a portion of the steps of a method 100 for stabilizing the CEP 12 of a laser oscillator system 16 in accordance with various embodiments of the present invention is listed in FIG. 5. The steps may be performed in the order as shown in FIG. 5, or they may be performed in a different order. Furthermore, some steps may be performed concurrently as opposed to sequentially. In addition, some steps may be omitted.

In connection with step 101, a laser beam 46 from an oscillator 40 is split to create a first portion of the laser beam 46. A first beam splitter 18 may split the laser beam 46 and redirect the first portion.

In connection with step 102, an electrical first feedback signal 62 is generated corresponding to the first portion of the laser beam 46. The first beam splitter 18 may redirect the first portion of the laser beam 46 to a first photodetector 20, which generates the first feedback signal 62.

In connection with step 103, the laser beam 46 is split to create a second portion of the laser beam 46. The laser beam 46 may be split and the second portion may be redirected by a second beam splitter 22.

In connection with step 104, the second portion of the laser beam 46 is filtered using a low-pass filter 24. The low-pass filter 24 may receive the second portion of the laser beam 46 from the second beam splitter 22. The shorter wavelength components of the pulses of the laser beam 46 may be attenuated.

In connection with step 105, an electrical second feedback signal 64 is generated corresponding to the filtered second portion of the laser beam 46. A second photodetector 26 may receive the filtered second portion of the laser beam 46 and generate the second feedback signal 64.

In connection with step 106, the frequency of the first feedback signal 62 is divided by a factor. The first feedback signal 62 may be received by a phase stabilizer 28, which may divide the frequency of the first feedback signal 62 by four, in various embodiments.

In connection with step 107, an error signal 66 is generated corresponding to the difference between the frequency-divided first feedback signal 62 and the second feedback signal 64. The phase stabilizer 28 may receive the second feedback signal 64. The phase stabilizer 28 may compare the frequency-divided first feedback signal 62 with the second feedback signal 64 and may generate the error signal 66 that corresponds to the difference therebetween.

In connection with step 108, an optical modulator signal 68 is generated to modulate the laser beam 46 within the oscillator 40 corresponding to the error signal 66. The laser beam 46 may be modulated by an optical modulator 32 within a cavity 60 of the oscillator 40 which may be controlled by an optical modulator driver 30. The error signal 66 may be utilized by the optical modulator driver 30 in order to control the operation of the optical modulator 32.

In connection with step 109, the temperature of the oscillator 40 is changed according to the optical modulator signal 68. A thermal control element 36 may be utilized to change the temperature of the oscillator 40, or specific components of the oscillator 40, such as a crystal 54. A thermal control driver 34 may utilize the optical modulator signal 68 in order to control the operation of the thermal control element 36. Controlling the temperature of the oscillator 40, or components thereof, in combination with modulating the laser beam 46 in the cavity 60 of the oscillator 40 may stabilize the CEP 12 of the laser beam 46 for longer periods of time as compared with just modulating the laser beam 46 in the cavity 60 of the oscillator 40 alone.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A feedback control module for stabilizing a carrier-envelope phase of an output of a laser oscillator system including an oscillator, the feedback control module comprising:
    an optical modulator configured to modulate a laser beam within the oscillator corresponding to an error signal related to the carrier-envelope phase; and
    a thermal control element configured to change the temperature of the oscillator corresponding to a signal operable to control the optical modulator.

2. The feedback control module of claim 1, further including—
    a first photodetector configured to generate an electrical first feedback signal corresponding to a first portion of the laser beam from the oscillator,
    a second photodetector configured to generate an electrical second feedback signal corresponding to a second portion of the laser beam filtered by a low-pass filter, and
    a phase stabilizer configured to divide the frequency of the first feedback signal by a factor and generate the error signal corresponding to the difference between the frequency-divided first feedback signal and the second feedback signal.

3. The feedback control module of claim 2, further including a first beam splitter configured to redirect the first portion of the laser beam to the first photodetector.

4. The feedback control module of claim 2, further including a second beam splitter configured to redirect the second portion of the laser beam to the low-pass filter.

5. The feedback control module of claim 2, further including an optical modulator driver configured to adjust the optical modulator based on the error signal.

6. The feedback control module of claim 5, further including a thermal control driver configured to adjust the thermal output of the thermal control element based on a signal from the optical modulator driver.

7. A feedback control module for stabilizing a carrier-envelope phase of an output of a laser oscillator system, the feedback control module comprising:
    a first photodetector configured to generate an electrical first feedback signal corresponding to a first portion of a laser beam from an oscillator;
    a second photodetector configured to generate an electrical second feedback signal corresponding to a second portion of the laser beam filtered by a low-pass filter;
    a phase stabilizer configured to divide the frequency of the first feedback signal by a factor and generate an error signal corresponding to the difference between the frequency-divided first feedback signal and the second feedback signal;
    an optical modulator configured to modulate the laser beam within the oscillator corresponding to the error signal; and
    a thermal control element configured to change the temperature of the oscillator corresponding to a signal operable to control the optical modulator.

8. The feedback control module of claim 7, further including a first beam splitter configured to redirect the first portion of the laser beam to the first photodetector.

9. The feedback control module of claim 7, further including a second beam splitter configured to redirect the second portion of the laser beam to the low-pass filter.

10. The feedback control module of claim 7, further including an optical modulator driver configured to adjust the optical modulator based on the error signal.

11. The feedback control module of claim 10, further including a thermal control driver configured to adjust the thermal output of the thermal control element based on a signal from the optical modulator driver.

12. A laser oscillator system comprising:
    a laser source configured to generate a laser beam;
    an oscillator configured to generate a series of laser beam pulses from the laser beam, the oscillator including a cavity; and
    a feedback control module according to claim 1.

13. The laser oscillator system of claim 12, further including a chirped-mirror unit configured to compress the laser beam pulses from the oscillator and compensate for dispersion.

14. The laser oscillator system of claim 12, further including a periodically-poled lithium niobate crystal configured to change the wavelength of the laser beam pulses.

15. A method for stabilizing the carrier-envelope phase of a laser oscillator system, the method comprising the steps of:
    a) generating an electrical first feedback signal corresponding to a first portion of a laser beam from an oscillator;
    b) filtering a second portion of the laser beam using a low-pass filter;
    c) generating an electrical second feedback signal corresponding to the filtered second portion of the laser beam;
    d) dividing the frequency of the first feedback signal by a factor;
    e) generating an error signal corresponding to the difference between the frequency-divided first feedback signal and the second feedback signal; and
    changing the temperature of the oscillator corresponding to an optical modulator signal.

16. The method of claim 15, further including the step of generating the optical modulator signal to modulate the laser beam within the oscillator corresponding to the error signal.

17. The method of claim 16, wherein the laser beam within the oscillator is modulated using an acousto-optic modulator.

18. The method of claim 16, wherein the laser beam that is modulated is from a laser source.

19. The method of claim 15, further including the step of splitting the laser beam to create the first portion.

20. The method of claim 15, further including the step of splitting the laser beam to create the second portion.

* * * * *